US006700327B2

(12) United States Patent
Leleve et al.

(10) Patent No.: US 6,700,327 B2
(45) Date of Patent: Mar. 2, 2004

(54) DEVICE CONNECTING A LAMP IN A MOTOR VEHICLE

(75) Inventors: Joël Leleve, Bobigny Cedex (FR); Philippe Couillaud, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/156,621

(22) Filed: May 28, 2002

(65) Prior Publication Data

US 2003/0001506 A1 Jan. 2, 2003

(30) Foreign Application Priority Data

May 28, 2001 (FR) .......................................... 01 07110

(51) Int. Cl.[7] ............................ B60Q 1/26; H02H 9/00
(52) U.S. Cl. ........................................ 315/80; 361/18
(58) Field of Search ............................ 315/77, 78, 80, 315/51, 56; 361/18, 19, 20, 90

(56) References Cited

U.S. PATENT DOCUMENTS

| | | | | |
|---|---|---|---|---|
| 4,239,978 A | * 12/1980 | Kofink | ........................ | 307/16 |
| 4,775,822 A | * 10/1988 | Statnic et al. | ............... | 315/224 |
| 5,285,344 A | * 2/1994 | Heitzmann | ................... | 361/22 |
| 5,512,812 A | * 4/1996 | Ono | ............................ | 322/28 |
| 5,742,130 A | 4/1998 | Korkala | ....................... | 315/77 |

FOREIGN PATENT DOCUMENTS

| | | | |
|---|---|---|---|
| DE | 199 03 636 | 8/1999 | ............ B60Q/1/02 |
| WO | WO 95/15599 | 6/1995 | ......... H01R/33/945 |

* cited by examiner

*Primary Examiner*—Don Wong
*Assistant Examiner*—Minh D A
(74) *Attorney, Agent, or Firm*—Morgan & Finnegan, LLP

(57) ABSTRACT

In a motor vehicle, a filament lamp is mounted in a connecting device. A vehicle electrical system has a system or network voltage which is higher than a nominal lamp voltage. The device incorporates a voltage reduction circuit which reduces a voltage from its network value to approximately the nominal lamp voltage, while also retaining the lamp itself and connecting it electrically.

15 Claims, 2 Drawing Sheets

DEVICE CONNECTING A LAMP IN A MOTOR VEHICLE

FIELD OF THE INVENTION

This invention relates to a device for the electrical connection of a filament lamp of a given nominal voltage, in a motor vehicle having an electrical power supply network which is under a network voltage higher than the nominal lamp voltage.

BACKGROUND OF THE INVENTION

As the number of items of electrical equipment in a motor vehicle becomes higher and higher, an increase in the available electrical power is becoming more and more necessary. This leads to an increase in the network voltage of the vehicle electrical system, in order to avoid the occurrence of excessively high currents in the system. The unidirectional network voltage is usually 12 volts in current automobiles such as family cars or 24 volts in heavy goods vehicles (trucks). Sometimes, this voltage must increase substantially, in particular to reach as high as 42 volts. Technical considerations appropriate to the automotive field, linked to the size of the tungsten filament of the lamp, make it improbable that filament lamps directly supplied at 42 volts can or will be made. Filament lamps arranged to function at a voltage of 12 volts will still be in service even where the network voltage of the vehicle is higher than the nominal lamp voltages. Various solutions have already been proposed to overcome this problem.

In this connection, systems are known with a centralized architecture which comprises a DC/DC converter which supplies a reduced unidirectional voltage, for example at 12 volts, from a higher input voltage which may for example be 42 volts. This solution makes it necessary to provide a 12 volt battery as well as the converter. This arrangement results in relatively high cost and a significant space requirement.

It is also known to provide apparatus with an independent electrical control unit which enables the unidirectional voltage applied to the lamps to be regulated by a pulse width modulated (PWM) control signal. Such a control unit is remote from the various lamps which are to be supplied, and must be connected to the fittings that carry those lamps, the connection being made by electrical wires. This arrangement has various drawbacks, in particular the size of the control unit to be provided, the power of which must be high enough to supply all of the appropriate lamps in the vehicle. Cabling must be provided between tho control unit and the lamps. In addition, it is difficult with this arrangement to satisfy the requirements for electromagnetic compatibility, due to the emission of parasitic radiation set up by the pulse width modulated control signal.

DISCUSSION OF THE INVENTION

A primary object of the invention is to provide a device for the connection of a filament lamp, having a nominal voltage lower than that of the power supply network, but which responds better than at present to the various requirements found in practice. In particular, it is desirable that the connecting device enables a double network to be avoided in the cable bundle. It is also desirable that it shall facilitate adaptation to a higher voltage and provide proper screening against electromagnetic radiation.

According to the invention, a device for connecting a filament lamp, having a given nominal voltage, in a motor vehicle equipped with a network for power supply at a voltage greater than the nominal voltage of the lamp, is characterised in that the device incorporates an electronic circuit including components for reducing the voltage from the network voltage to a voltage close or equal to the nominal voltage of the lamp, the device also incorporating means for making the electrical connection of the lamp.

Preferably, the device further provides mechanical fastening for the lamp.

The device may constitute a connector for the lamp, for plug-in connection of terminal tags of the lamp. Alternatively, it may constitute a lamp holder socket.

The device preferably includes a casing of plastics material in which the electronic circuit for reducing the voltage is placed, the casing being provided with electrical connecting contacts or sockets for connection with the filament lamp.

According to a preferred feature of the invention, the casing incorporates a metallic cooling element for the electronic components of the circuit, the said metallic element also providing screening for purposes of electromagnetic compatibility.

Where the device is a connector comprising a casing of plastics material containing the electronic voltage reduction circuit and arranged to receive and provide electrical connection to plug-in tags of the lamp, then, according to a preferred feature of the invention, the casing includes two projecting elements which are open in a face remote from the casing, each said projecting element having an internal metallic tongue, the said tongues being connected to the output terminal of the voltage reduction circuit, the tongues being arranged to receive and mechanically hold the tags of the lamp, besides making the electrical connection thereof. Preferably, the projecting elements completely surround the tongues, whereby to insulate the said tongues electrically.

Where the device comprises a lamp holder socket in the form of a sleeve, for example for bayonet or screw-type fastening of the lamp, and has a casing of plastics material containing the electronic voltage reduction circuit, the sleeve is joined to one face of the casing which includes, on another face, a projecting element open at the end thereof remote from the circuit, with two electrical contacts being mounted within the said projecting element.

Preferably, the said circuit is arranged to establish pulse width modulation and to provide an output voltage close or equal to the nominal voltage of the lamp. The said circuit preferably then comprises an integrated circuit which is arranged to produce a pulse width modulated signal on its output, together with components for creating a regulated voltage suitable for proper operation of the integrated circuit.

Preferably, the frequency of the pulse width modulated signals is chosen to be large enough to prevent any perception by the human eye of any variation in light intensity from the lamp, having regard to retinal persistence. In particular, the frequency is in the range between 60 Hz and 500 Hz.

The connecting device according to the invention enables additional connections to be avoided with respect to a current 12 volt or 24 volt network or a future 42 volt network. In this connection, the network voltage is 42 volts, while the nominal voltage of the lamp is 12 or 24 volts.

Preferably, the said components of the circuit are soldered on a printed circuit, as are the output terminals and the input wires.

Electromagnetic compatibility is facilitated by the fact that the lamp filament is very close to the control means which reduce the voltage to the lamp input value.

Further arrangements, objects and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 1:
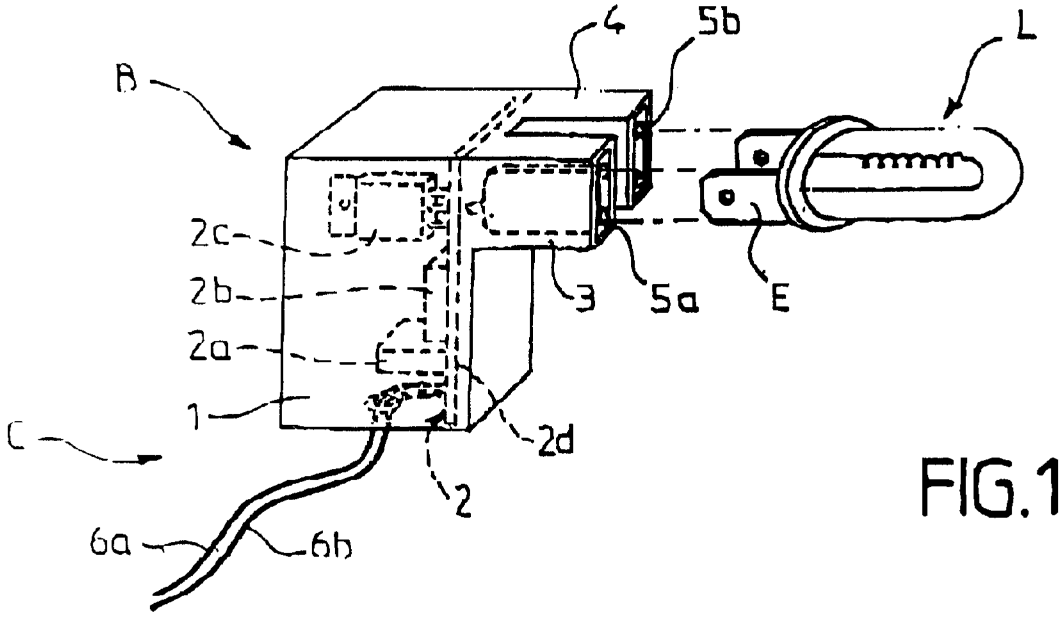
FIG. 1 is a diagrammatic perspective view of a device according to the inventions consisting of a plug-in connector.

Reference is first made to FIG. 1, which shows a device B for the connection of a filament lamp L having a given nominal voltage V0, which is for example equal to 12 volts, for a motor vehicle having an electrical supply network which operates at a unidirectional voltage V1 greater than V0. The voltage V1 may for example be equal to 42 volts.

The device B comprises a casing 1 which in particular is in the form of a rectangular parallelepiped, and which is preferably made of plastics material. The casing 1 includes an internal circuit 2 having electronic components 2*a,* 2*b,* 2*c* for reducing the network voltage V1 to a voltage which is close to, or equal to, the nominal voltage V0 of the lamp. The device B is a connector C for the lamp L, which has plug-in tags E.

The casing 1 has on one of its major faces two projecting elements 3 and 4, each in the form of a hollow rectangular parallelepiped. The generatrices of the latter lie at right angles to the major face of the casing. The elements 3 and 4 are open on the side remote from the casing 1, and they include internal metal tongues 5*a* and 5*b*. These tongues are connected to the output terminals of the voltage reduction circuit 2, in such a way that the voltage V0 is applied to them. The tongues 5*a* and 5*b* are arranged to receive, and to retain mechanically, the tags E of the lamp L, while also making the appropriate electrical connections.

The projecting elements 3 and 4 completely surround the tongues 5*a* and 5*b* so as to insulate the tongues electrically. The tongues do of course act as connecting terminals.

The electronic circuit 2 is connected to two wires 6*a* and 6*b* which extend through the wall of the casing and connect the device B to the power supply network of the vehicle at the voltage V1. The components of the circuit 2, indicated at 2*a,* 2*b,* 2*c* are soldered on a printed circuit 2*d,* as are the output terminals 5*a* and 5*b* and the input wires 6*a* and 6*b*. The casing 1 is compact, and is rigid enough mechanically to protect the components inside it. The casing also prevents any access to the working parts. The casing 1 may in fact also incorporate metallic cooling portions (not shown) which serve as radiators to dissipate electrical energy and provide screening against electromagnetic radiation.

The connector C, consisting of the casing 1 with the voltage reduction circuit 2, is of sufficiently reduced size to be able to be installed in place of an ordinary connector of a kind that does not provide a voltage reduction facility.

Figure 2:
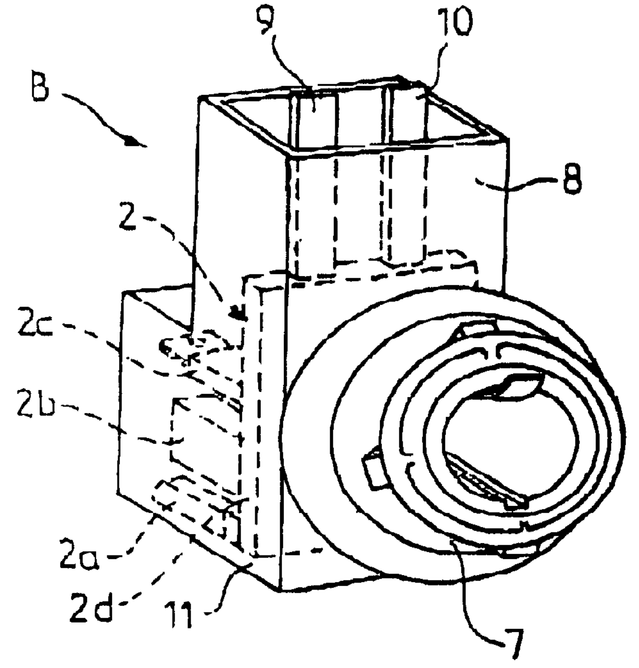
FIG. 2 is a perspective view of another version of the connecting device in the form of a lamp socket.

Reference is now made to FIG. 2, which shows another version in which the connecting device B has a lampholder socket 7 joined to one face of a casing 11 of plastics material which, like the casing 1 in FIG. 1, contains an electronic circuit 2 with components for reducing the voltage from the voltage V1 of the electrical network of the vehicle to the nominal voltage of the lamp. The electrical contacts (not visible in FIG. 2) of the socket 7 are connected to the output of the circuit 2. The socket 7 shown in FIG. 2 is of the type in which the lamp is fixed by a bayonet fitting, but it could be of a different type, for example the screw type.

On another face, generally at right angles to the one that carries the socket 7, the casing 11 has a projecting element 8 in the form of a parallelopiped which is open at its end remote from the circuit 2. Two contact elements 9 and 10 are mounted in the projecting element B. The contact elements 9 and 10 are arranged to engage in a connector which is connected to wires that are themselves connected to the power supply network at 42 volts. Here again, the socket 7 and casing 11 form a unit which is compact enough to replace an ordinary lamp holder.

Figure 3:
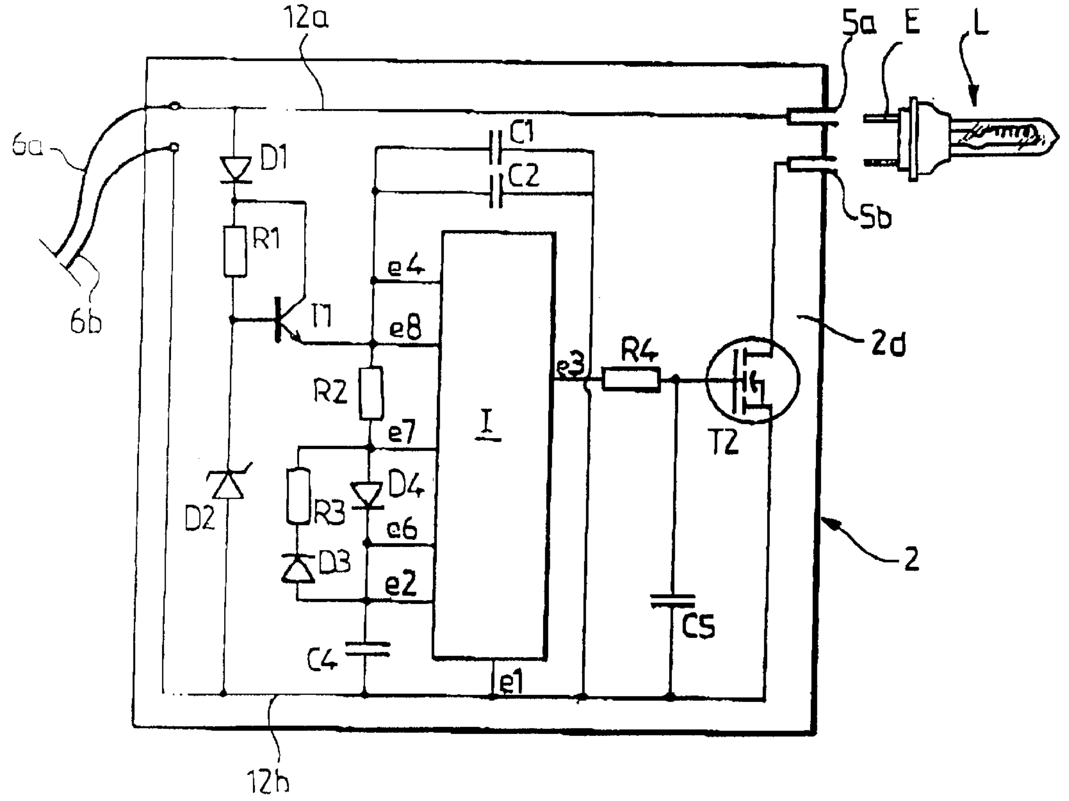
FIG. 3 is a diagram on a larger scale of the electronic voltage reduction circuit incorporated in the casing of the device.

Reference is now made to FIG. 3, which is one example of a suitable voltage reduction circuit 2, shown in circuit diagram form. The circuit 2 is arranged to provide an output voltage V0 close to 12 V, by pulse width modulation (commonly referred to as a PWM signal). This circuit will now be described.

A supply wire 6*a* is connected directly through a line 12*a* to one of the output terminals 5*a.* The other power supply wire 6*b* is connected through a line 12*b* to the source electrode of a transistor T2 of the MOS type. The drain of the transistor T2 is connected to the other output terminal 6*b.* A bridge is established between the lines 12*a* and 12*b*. This bridge comprises a diode D1, the anode of which is connected on the line 12*a.* The cathode of the diode D1 is connected through a resistor R1 to the cathode of a Zener diode D2, the anode of which is connected to the line 12*b.* The Zener voltage of the diode D2 constitutes a reference voltage.

The base of a transistor D1, which is for example of the NPN type, is connected to the cathode of the diode D2. The collector of the transistor T1 is connected to the cathode of the diode D1. The emitter of the transistor T1 is connected to an input e8 of an integrated circuit I which is arranged to produce a PWM signal on its output e3. This circuit I may typically be an integrated circuit of the kind having the reference NE555. An input e1 of the circuit I is connected to the line 12*b.* Another input e2 is connected to the anode of a diode D3, the cathode of which is connected to an input e7 through a resistor R3.

Two capacitors C1 and C2 are connected in parallel between an input e4 and the line 12*b.* The input e4 is also connected to the input e8, and, through a resistor R2, to the anode of a diode D4. The input e7 is also connected to the anode of the diode D4. The cathode of the diode D4 is connected through a capacitor C4 to the line 12*b.* A further input e6, together with the input e2, are connected to the cathode of the diode D4.

The output e3 of the circuit I is connected through a resistor R4 to the grid of the transistor T2. A capacitor C5 is connected between the grid of the diode T2 and the line 12*b.*

The components D1, R1, T1, D2, C1 and C2 create a regulated voltage of 12 V, corresponding to the Zener voltage of the diode D2, this being the voltage required for proper operation of the integrated circuit I.

Figure 4:
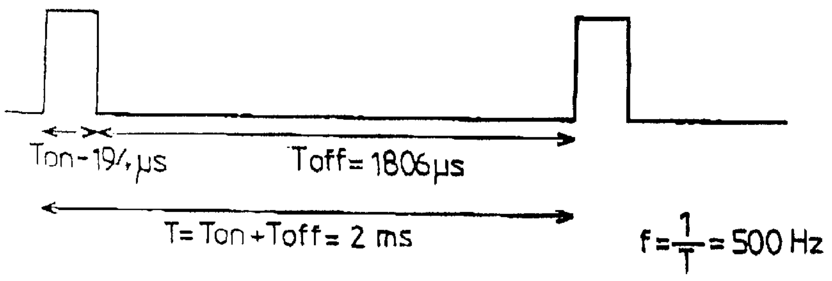
FIG. 4 is a diagram showing the supply pulses for a lamp.

The circuit I generates on its output e3 the PWM signal which is diagrammatically illustrated in FIG. 4, to which reference is now made. In FIG. 4, voltage is on the ordinate and time on the abscissa. The duration of the pulse Ton (time on circuit) is fixed by the values of R2 and C4, while time out of circuit, Toff, is fixed by the values of R3 and C4. The duration T of one period is equal to Ton+Toff, and is in particular equal to 2 ms, which corresponds to a frequency (f=1/T) of 500 Hz. This frequency is chosen in order to prevent any perception of any variation in the light intensity from the lamp by the human eye, and takes account of retinal persistence. By way of an example, if R2=2.37 kΩ, R3=22.56 kΩ, and C4=100 nF, then Ton=194 μs and Toff-1806 Ωs.

The components R4 and C5 enable the fronts of the signals applied to the grid of the transistor T2 to be adjusted so as to conform to the requirements for electromagnetic compatibility (EMC). The transistor T2 applies the voltage V1 from the network, that is to say 42 V in the example under consideration, to the terminals 5*a* and 5*b* of the lamp in response to the PWM signal, so as to provide an effective voltage of the same order as the nominal voltage of the lamp which is, for example, 12.8 V. The transistor T2 may be of the SMART type so as to add regulation and current limitation. One suitable example is that sold under the reference VNP35N07. External regulation of the current may be obtained using a shunt.

Upstream of the circuit, filter components of the "selfs" type, and capacitors (not shown in FIG. 3) may be arranged to stop parasitic pulses that may occur on the power supply lines 6*a* and 6*b*.

A thermal resistance may be created between the terminals 5*a*, 5*b* and the circuit 2, so that heat given off by the lamp L will not be collected in the casing. The casing may also incorporate suitable metallic elements for cooling the transistor T2.

The invention enables additional connections, as compared with a current 12 V or a future 42 V network, to be avoided. It becomes extremely simple to provide for different models of 12 V and 42 V lamps.

The provision of electromagnetic compatibility is considerably facilitated by the proximity of the filament of the lamp L to the control circuit 2 mounted within the connector or in the lamp holder.

The use of pulse width modulation with rectangular (square wave) signals creates electromagnetic parasites essentially by the rising fronts of the signals. The magnitude of the radiation resulting from these parasites increases with the length of the antenna. The antenna consists of the connecting wires between the output of the circuit 2 and the connecting terminals of the lamp L. But here, since the voltage reduction circuit is incorporated in the connector or in the lamp holder, the length of the connecting wires, and therefore the length of the antenna, is minimised. Parasitic radiation is therefore considerably reduced.

The invention avoids the use of a twin voltage network at 42 V and 12 V in the wiring bundles, which is an important consideration for the manufacturer from the cost point of view. There is no difference between the designs of headlights or indicating devices operating at 12 V, and those operating at 42 V.

What is claimed is:

1. A connector for connecting, comprising:

a filament lamp in a motor vehicle having an electrical power supply network adapted to give a network voltage, said lamp having a given nominal voltage smaller than said network voltage, such that nominal voltage of said supply network is permanently higher than that of said nominal lamp voltage, the connector further includes input means for connection to said network, output means for connection to said lamp, and an electronic voltage reduction circuit comprising components connected between said input and output means, said circuit being adapted for reducing voltage from the network voltage to a value substantially equal to said nominal lamp voltage.

2. A connector according to claim 1, further including means for mechanically securing the lamp to the connector.

3. A connector according to claim 1, wherein said lamp further includes at least one plug-in connecting tag, and the connector also further includes a lamp holder means for plug-in connection of said tag.

4. A connector according to claim 3, comprising a casing of plastics material, said voltage reduction circuit being incorporated within the casing, and wherein the casing includes two projecting elements open in a face remote from the casing, each said projecting element having an internal metallic tongue connected to a respective output means of the voltage reduction circuit, said tongues being further adapted to receive and mechanically hold the plug-in tags of the lamp while also making its electrical connection.

5. A connector according to claim 4, wherein each said projecting element completely surrounds the corresponding said tongue whereby to insulate the latter electrically.

6. A connector according to claim 1, further including a lamp holder socket.

7. A connector according to claim 1, comprising a casing of plastics material, said voltage reduction circuit being incorporated within the casing.

8. A connector according to claim 7 further including a lamp holder socket, wherein the casing defines a first face and a second face of the casing, the lamp holder socket being joined to said first face, the connector further including a projecting element on said second face, said projecting element having an open end remote from said voltage reduction circuit, and the connector further including two contact elements contained within said projecting element.

9. A connector according to claim 7, wherein the casing incorporates a metallic cooling element for cooling the electronic components of the voltage reduction circuit and for acting as a screen for purposes of electromagnetic compatibility.

10. A connector according to claim 1, wherein said voltage reduction circuit is arranged for pulse width modulation, being further adapted to give an output voltage approximately equal to said nominal lamp voltage.

11. A connector according to claim 10, wherein said voltage reduction circuit includes an integrated circuit for producing a pulse width modulated signal on its output, and electronic components connected with said integrated circuit for creating a regulated voltage appropriate to proper operation of the integrated circuit.

12. A connector according to claim 10, wherein said voltage reduction circuit is adapted to produce said pulse width modulated signals in a frequency high enough to avoid any perception by a human eye of variation in intensity of light emitted by said lamp, having regard to retinal persistence.

13. A connector according to claim 12, wherein said frequency is in the range between 60 and 600 Hz.

14. A connector according to claim 1, further including a printed circuit, together with output contacts for electrical contact with said lamp, and power input wires, said output contacts, input wires, and the electronic components of said voltage reduction circuit all being soldered on said printed circuit.

15. A connector according to claim 1, wherein the network voltage is 42 volts and the nominal lamp voltage has a value selected from the group consisting of 12 volts and 24 volts.

* * * * *